(No Model.)  
2 Sheets—Sheet 1.

T. HARRINGTON.
RACING SULKY.

No. 498,790. Patented June 6, 1893.

Witnesses  
Ella P. Blenus  
Sunion E. King

Inventor  
Theodore Harrington  
By Chas. H. Burleigh  
Attorney (No Model.) 2 Sheets—Sheet 2.
T. HARRINGTON.
RACING SULKY.
No. 498,790. Patented June 6, 1893.
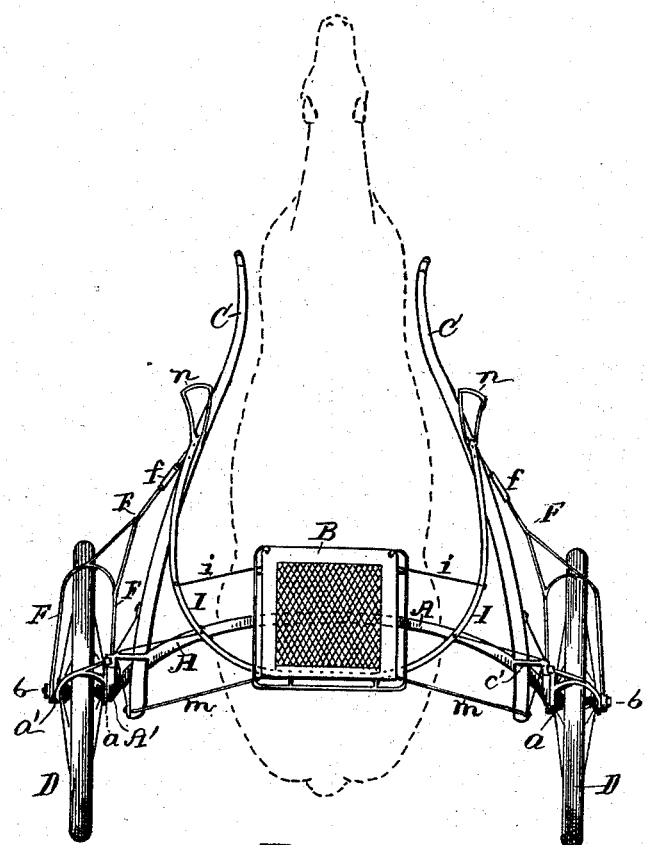
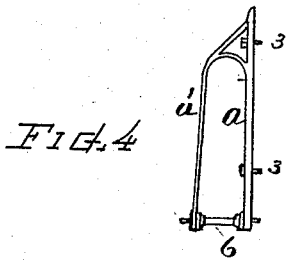
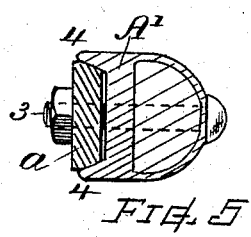
Witnesses
Ella P. Blunus
Simion E. King
Inventor
Theodore Harrington
By Chas. H. Burleigh
Attorney

United States Patent Office.

THEODORE HARRINGTON, OF SOUTHBRIDGE, MASSACHUSETTS.

RACING-SULKY.

SPECIFICATION forming part of Letters Patent No. 498,790, dated June 6, 1893.

Application filed December 31, 1892. Serial No. 456,906. (No model.)

*To all whom it may concern:*

Be it known that I, THEODORE HARRINGTON, a citizen of the United States, residing at Southbridge, in the county of Worcester and State of Massachusetts, have invented a new and useful Racing-Sulky, of which the following, together with the accompanying drawings, is a specification sufficiently full, clear, and exact to enable persons skilled in the art to which this invention appertains to make and use the same.

The object of my present invention is to provide a sulky for horse racing and driving that will run with ease; permit free action of the horse and afford a convenient position for the driver, as hereinafter explained.

Another object is to provide, in a sulky of the character described, an efficient and desirable means for adjusting the height of the body in relation to the wheels to adapt the sulky to different horses.

These objects I attain by a sulky constructed as shown and described; the particular features claimed being hereinafter definitely specified.

Figure 1:
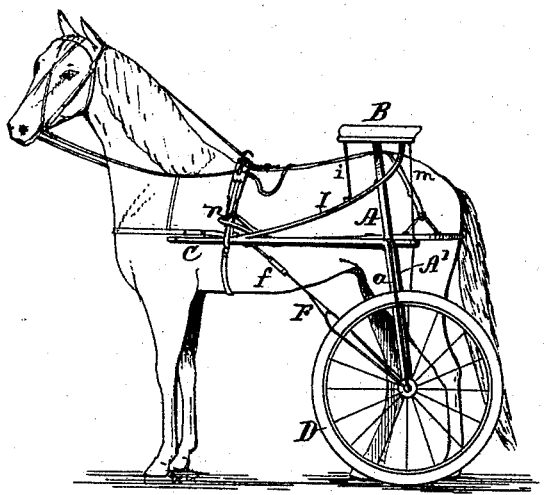
Figure 2:
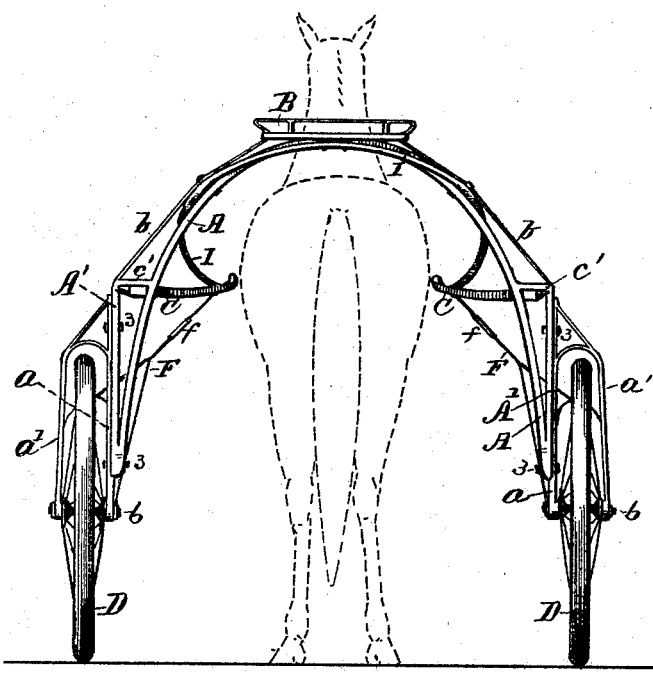

In the drawings, Figure 1 is a side view of my invention. Fig. 2 is a rear view on somewhat larger scale. Fig. 3 is a plan view. Fig. 4 is a separate view of the wheel frame, and Fig. 5 is a section view of the wheel frame and axle-body connection.

Referring to parts, A denotes the axle or body; B the seat; C the thills, and D the wheels.

The axle A is formed with a high arch or of a suitable form adapting it to extend over the back of the horse when the sulky is in use; and it is disposed so as to stand at or near the position of the hip joint, as indicated in Fig. 1; the thills C being of short length and their rear ends separately secured to the respective sides of the axle, thus leaving the rear of the sulky completely open as indicated in Figs. 2 and 3. At each side the axle is provided with an upright portion A' rigidly fixed to the arched portion, and having its upper end joined thereto by a bar or brace c' at the position of the thill connection. It is also sustained by a brace b that extends to the upper part of the axle. The uprights are fitted to receive the wheel frames a, preferably with intermatching guide-ways or lips 4 (see Fig. 5) that support the parts laterally while permitting up and down adjustment; suitable clips or clamp bolts 3 being provided for securing the two parts A' and a fixed together.

The wheels D are best made of that class having pneumatic tires, and mounted with ball-bearings on short axis-arbor 6 that are secured in the lower ends of the adjusting frames a. The outer end of the axis arbor is supported by a brace a' that extends over the top of the wheel and joins the part a (see Fig. 4). A stay or double brace F joins the ends of the axis-arbor to the forward part of the thill. Said brace is provided at f with means for its elongative and contractive adjustment by right and left threaded sleeves or lapped plates to accommodate the upward and downward adjustments of the wheel frames a. A bow-shaped body-brace I extends from the fore part of one thill around the upper part of the axle-arch and seat and to the fore part of the opposite thill, its ends properly secured to the thills and its bow to the axle arch at its points of junction therewith.

The seat B is supported on the axle and body-brace at a position that is directly over the horse when harnessed in the sulky. Suitable braces i and m are provided for giving rigid support to the seat as indicated. Stirrups or foot-rests n are provided near the fore part of the thills C or brace I.

When the driver is seated he occupies a position immediately over the horse; and in the event of any accident that would wreck the sulky the driver would be left upon the back of the horse by the throwing of the seat from beneath him.

I claim—

1. A racing sulky having its axle or body adapted to extend over the back of the horse, and provided with wheels at the sides thereof mounted on axis arbors, the respective ends of which are secured in wheel-frames that are connected with upright guideways attached to said axle, the wheel-frames being adjustable on the guideways for varying the relative height of the sulky body, and means for fastening said wheel-frames at position of adjustment, substantially as set forth.

2. In a racing sulky, the combination, of the high arched axle adapted to extend over the back of the horse, and having the upright guides at the sides thereof, the wheel frames adjustably secured in said guide, the wheels mounted in said frames, the thill-braces extending from the wheel-axes to the fore part of the thills, and means for adjustment in the length of said thill-braces, substantially as and for the purpose set forth.

3. In a racing sulky, the combination substantially as described, of the high arched axle, the short thills having their rear ends attached thereto, the bow-shaped body-brace, the seat mounted at the top of said axle and bow-brace at a position that comes over the back of the horse, the pneumatic wheels and their axis-arbors mounted in the wheel-frames that are attached to the sides of said arched axle, and the stays or braces arranged in connection with the thills and wheel arbors, for the purposes set forth.

Witness my hand this 28th day of December, A. D. 1892.

THEODORE HARRINGTON.

Witnesses:
CHAS. H. BURLEIGH,
ELLA P. BLENUS.